United States Patent
Xiao et al.

(10) Patent No.: US 9,872,242 B2
(45) Date of Patent: Jan. 16, 2018

(54) JOINT TRANSMISSION OF CSI-RS FOR CHANNEL STATE FEEDBACK AND TRANSMISSION POINT SELECTION

(71) Applicant: QUALCOMM Incorporated, San Diego, CA (US)

(72) Inventors: Lei Xiao, San Jose, CA (US); Brian Clarke Banister, San Diego, CA (US); Amir Farajidana, Sunnyvale, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/606,757

(22) Filed: Jan. 27, 2015

(65) Prior Publication Data

US 2015/0223161 A1     Aug. 6, 2015

Related U.S. Application Data

(60) Provisional application No. 61/934,696, filed on Jan. 31, 2014.

(51) Int. Cl.
*H04L 5/00* (2006.01)
*H04W 48/20* (2009.01)
(Continued)

(52) U.S. Cl.
CPC .......... *H04W 48/20* (2013.01); *H04B 7/0417* (2013.01); *H04B 7/0478* (2013.01);
(Continued)

(58) Field of Classification Search
CPC .. H04B 7/0413–7/0684; H04B 7/022–7/0408; H04W 48/20;
(Continued)

(56) References Cited

U.S. PATENT DOCUMENTS 8,599,711 B2   12/2013  Hugl et al.
8,861,430 B2   10/2014  Liao et al.
(Continued)

FOREIGN PATENT DOCUMENTS

WO   WO-2012057462 A1   5/2012
WO   WO-2012112291 A1   8/2012
WO   WO-2013112829 A1   8/2013

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP Draft; Draft36213-COO, 3rd Generation Partnership Project (3GPP), Mobile Competence Centre; 650, Route Des Lucioles; F-06921 Sophia-Antipolis Cedex; France, Dec. 16 2013 (Dec. 16, 2013), pp. 1-186, XP050750332, Retrieved from the Internet: URL:http://www.3gpp.org/ftp/tsg_ran/WG1_RL1/DRAFT/ [retrieved on Dec. 16, 2013].

(Continued)

*Primary Examiner* — Edan Orgad
*Assistant Examiner* — Ivan O Latorre
(74) *Attorney, Agent, or Firm* — Nerrie M. Zohn

(57) ABSTRACT

Certain example embodiments of the present disclosure provide techniques for joint transmission of channel state information reference signals (CSI-RS) from multiple transmission points (TPs) for channel state feedback and/or TP selection. An example method generally includes coordinating with one or more other TPs to jointly transmit a channel state information reference signal (CSI-RS) to a user equipment (UE); signaling a reporting restriction to the UE; receiving precoding matrix indicator (PMI) feedback from the UE based on the jointly transmitted CSI-RS and subject to the reporting restriction; and selecting one or more of the TPs to serve based on the PMI feedback.

22 Claims, 14 Drawing Sheets

(51) Int. Cl.
  *H04B 7/0417* (2017.01)
  *H04B 7/04* (2017.01)
  *H04W 24/10* (2009.01)
  *H04W 72/04* (2009.01)

(52) U.S. Cl.
  CPC .......... *H04L 5/0035* (2013.01); *H04L 5/0057* (2013.01); *H04L 5/0073* (2013.01); *H04W 24/10* (2013.01); *H04W 72/042* (2013.01)

(58) Field of Classification Search
  CPC .. H04W 24/10; H04W 72/042; H04L 5/0057; H04L 5/0073; H04L 5/0035
  See application file for complete search history.

(56) References Cited

U.S. PATENT DOCUMENTS

| | | | | |
|---|---|---|---|---|
| 9,148,818 | B2* | 9/2015 | Yue | H04L 5/001 |
| 2008/0232492 | A1* | 9/2008 | Xiao | H04B 7/0417 375/260 |
| 2010/0027456 | A1* | 2/2010 | Onggosanusi | H04B 7/024 370/312 |
| 2010/0039990 | A1* | 2/2010 | Jongren | H04B 7/0632 370/328 |
| 2010/0118989 | A1* | 5/2010 | Sayana | H04L 5/0035 375/260 |
| 2011/0170435 | A1* | 7/2011 | Kim | H04L 5/0023 370/252 |
| 2011/0194551 | A1* | 8/2011 | Lee | H04B 7/0626 370/342 |
| 2011/0312353 | A1* | 12/2011 | Banister | H04B 7/0691 455/500 |
| 2012/0082248 | A1* | 4/2012 | Han | H04B 7/0413 375/259 |
| 2012/0213109 | A1* | 8/2012 | Xu | H04B 7/024 370/252 |
| 2012/0218968 | A1* | 8/2012 | Kim | H04B 7/024 370/329 |
| 2012/0224551 | A1* | 9/2012 | Ding | H04B 7/024 370/329 |
| 2012/0287799 | A1* | 11/2012 | Chen | H04B 7/024 370/252 |
| 2013/0021926 | A1* | 1/2013 | Geirhofer | H04L 5/0048 370/252 |
| 2013/0039326 | A1* | 2/2013 | Kim | H04B 7/024 370/329 |
| 2013/0039349 | A1* | 2/2013 | Ebrahimi Tazeh Mahalleh | H04L 1/0013 370/336 |
| 2013/0083681 | A1* | 4/2013 | Ebrahimi Tazeh Mahalleh | H04L 5/0057 370/252 |
| 2013/0148515 | A1* | 6/2013 | Ribeiro | H04L 5/0094 370/252 |
| 2013/0156001 | A1* | 6/2013 | Gomadam | H04W 72/0406 370/330 |
| 2013/0163687 | A1* | 6/2013 | Jing | H04B 7/0658 375/267 |
| 2013/0208604 | A1* | 8/2013 | Lee | H04L 25/0226 370/252 |
| 2013/0322376 | A1* | 12/2013 | Marinier | H04W 72/06 370/329 |
| 2014/0016549 | A1* | 1/2014 | Novlan | H04B 7/0417 370/328 |
| 2014/0036796 | A1* | 2/2014 | Etemad | H04W 24/04 370/329 |
| 2014/0044061 | A1* | 2/2014 | Yue | H04W 72/042 370/329 |
| 2014/0169409 | A1* | 6/2014 | Ma | H04B 1/707 375/146 |
| 2014/0219162 | A1* | 8/2014 | Eyuboglu | H04W 16/26 370/315 |
| 2014/0226611 | A1 | 8/2014 | Kang et al. | |
| 2015/0124732 | A1* | 5/2015 | Seo | H04B 7/0413 370/329 |
| 2015/0207552 | A1* | 7/2015 | Nammi | H04B 7/0413 370/281 |
| 2015/0318966 | A1* | 11/2015 | Liu | H04W 28/16 370/329 |
| 2015/0381254 | A1* | 12/2015 | Liang | H04B 7/024 370/329 |

OTHER PUBLICATIONS

Interdigital: "Analysis of Feedback Mechanisms for CoMP", 3GPP Draft; R1-092585, 3rd Generation Partnership Project (3GPP), Mobile Competence Centre ; 650, Route Des Lucioles ; F-06921 Sophia-Antipolis Cedex; France, No. Los Angeles, USA; Jun. 24, 2009, Jun. 24, 2009 (Jun. 24, 2009), XP050351081, [retrieved on Jun. 24, 2009].

International Search Report and Written Opinion—PCT/US2015/013175—ISA/EPO—dated Apr. 9, 2015.

Texas Instruments: "Joint Processing Downlink COMP Precoding Support", 3GPP Draft; R1-090585 TI DL COMP Precoding, 3rd Generation Partnership Project (3GPP), Mobile Competence Centre; 650, Route Des Lucioles; F-06921 Sophia-Antipolis Cedex; France, No. Athens, Greece; Feb. 3, 2009, Feb. 3, 2009 (Feb. 3, 2009), pp. 1-6, XP050318475, [retrieved on Feb. 3, 2009].

\* cited by examiner

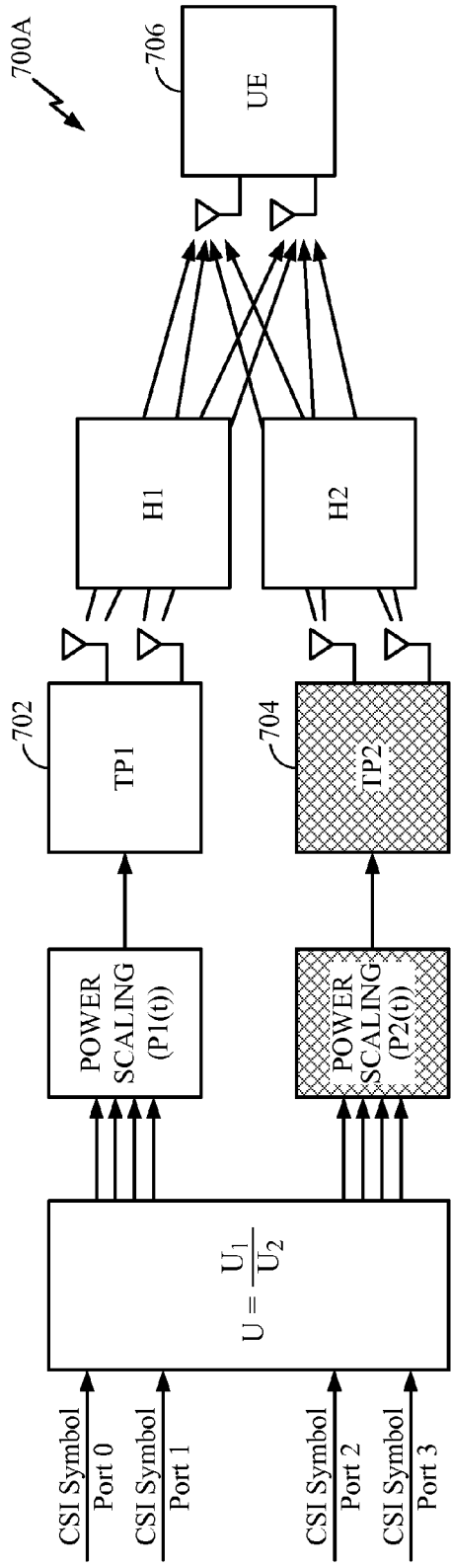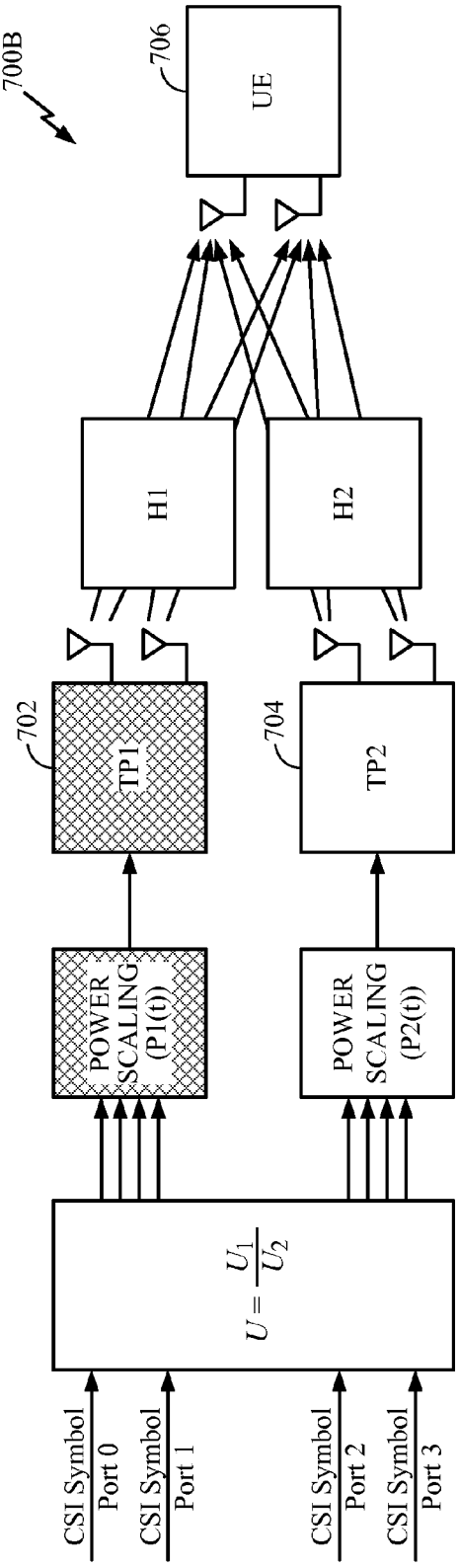
FIG. 7A
FIG. 7B

Rank1:

| Reported 4Tx PMI index | 12 | 13 | 14 | 15 |
|---|---|---|---|---|
| Selected Transmission point | TP2 | TP1 | TP2 | TP1 |
| Codebook index for selected Transmission point (2Tx code book) | 1 | 0 | 0 | 1 |

Rank2:

| Reported 4Tx PMI index | 13 | 14 |
|---|---|---|
| Selected Transmission point | TP1 | TP2 |
| Codebook index for selected Transmission point (2Tx code book) | 1 | 1 |

Rank1:

| $i_2$ | 0 | 0 | 0 | 0 | 2 | 2 | 2 | 2 |
|---|---|---|---|---|---|---|---|---|
| $i_1$ | 0 | 4 | 8 | 12 | 0 | 4 | 8 | 12 |
| Selected Transmission point | TP1 | TP1 | TP2 | TP2 | TP1 | TP1 | TP2 | TP2 |
| Codebook index for selected Transmission point (2Tx code book) | 0 | 2 | 0 | 2 | 1 | 3 | 1 | 3 |

1004

Rank2:

| $i_2$ | 0 | 0 | 0 | 0 |
|---|---|---|---|---|
| $i_1$ | 0 | 4 | 8 | 12 |
| Selected Transmission point | TP1 | TP1 | TP2 | TP2 |
| Codebook index for selected Transmission point (2Tx code book) | 1 | 2 | 1 | 2 |

FIG. 10

Rank1:

| $i_2$ | 0 | 0 | 0 | 0 | 2 | 2 | 2 | 2 |
|---|---|---|---|---|---|---|---|---|
| $i_1$ | 0 | 4 | 8 | 12 | 0 | 4 | 8 | 12 |
| Selected Transmission point | TP1 | TP1 | TP2 | TP2 | TP1 | TP1 | TP2 | TP2 |
| Codebook index for selected Transmission point (4Tx code book) | 13 | 14 | 13 | 14 | 15 | 12 | 15 | 12 |

Rank2:

| $i_2$ | 0 | 0 | 0 | 0 |
|---|---|---|---|---|
| $i_1$ | 0 | 4 | 8 | 12 |
| Selected Transmission point | TP1 | TP1 | TP2 | TP2 |
| Codebook index for selected Transmission point (4Tx code book) | 13 | 14 | 13 | 14 |

FIG. 11

| $i_2$ | 0 | 0 | 0 | 10 | 10 | 10 |
|---|---|---|---|---|---|---|
| $i_1$ | 0 | 1 | 2 | 0 | 1 | 2 |
| Selected Transmission point | TP1 | TP1 | TP1 | TP2 | TP2 | TP2 |
| Codebook index for selected Transmission point (2Tx code book) | 0 | 1 | 2 | 1 | 2 | 3 |

| $i_2$ | 8 | 8 | 8 | 2 | 2 | 2 |
|---|---|---|---|---|---|---|
| $i_1$ | 0 | 1 | 2 | 0 | 1 | 2 |
| Selected Transmission point | TP1 | TP1 | TP1 | TP2 | TP2 | TP2 |
| Codebook index for selected Transmission point (2Tx code book) | 1 | 2 | 3 | 0 | 1 | 2 |

|  | 1500A |  |
|---|---|---|
| $i_2$ | 0 | 14 |
| $i_1$ | 0 | 0 |
| Selected Transmission point | TP1 | TP2 |
| Codebook index for selected Transmission point (2Tx code book) | 0 | 1 |

FIG. 15A

|  | 1500B |  |
|---|---|---|
| $i_2$ | 1 | 1 |
| $i_1$ | 5 | 7 |
| Selected Transmission point | TP1 | TP2 |
| Codebook index for selected Transmission point (2Tx code book) | 2 | 2 |

FIG. 15B

|  | 1500C |  |
|---|---|---|
| $i_2$ | 12 | 2 |
| $i_1$ | 0 | 0 |
| Selected Transmission point | TP1 | TP2 |
| Codebook index for selected Transmission point (2Tx code book) | 1 | 0 |

FIG. 15C

|  | 1500D |  |
|---|---|---|
| $i_2$ | 1 | 1 |
| $i_1$ | 5 | 7 |
| Selected Transmission point | TP1 | TP2 |
| Codebook index for selected Transmission point (2Tx code book) | 2 | 2 |

FIG. 15D

JOINT TRANSMISSION OF CSI-RS FOR CHANNEL STATE FEEDBACK AND TRANSMISSION POINT SELECTION

CROSS-REFERENCE TO RELATED APPLICATIONS

This application claims benefit of U.S. Provisional Patent Application Ser. No. 61/934,696, entitled "Joint Transmission of CSI-RS for Channel State Feedback and Transmission Point Selection," filed Jan. 31, 2014 and assigned to the assignee hereof, the contents of which are herein incorporated by reference.

BACKGROUND

I. Field

Certain aspects of the disclosure generally relate to wireless communications and, more particularly, to techniques for joint transmission of channel state information reference signals (CSI-RS) from multiple transmission points (TPs) for TP selection and/or channel state feedback for the selected TP.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide techniques, corresponding apparatus, and program products, for performing multipoint transmissions.

Certain aspects of the present disclosure provide a method of performing multipoint communications. The method generally includes coordinating with one or more other TPs to jointly transmit a channel state information reference signal (CSI-RS) to a user equipment (UE), signaling a reporting restriction to the UE, receiving feedback from the UE based on the jointly transmitted CSI-RS and subject to the reporting restriction, and selecting one of the TPs to serve based on the feedback. Channel state feedback for the selected TP can also be derived from the feedback from the UE based on the jointly transmitted CSI-RS.

Certain aspects of the present disclosure also provide various apparatus and program products for performing the methods described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A-7B illustrate example transmissions of a jointly negotiated CSI-RS from multiple transmission points, according to an aspect of the present disclosure.

FIG. 9 illustrates example transmission point and codebook index selections for a reported PMI index in a two transmit antenna, 4-port CSI-RS configuration, according to an aspect of the present disclosure.

FIG. 10 illustrates example transmission point and codebook index selections for a reported PMI index in a two transmit antenna, 8-port CSI-RS configuration, according to an aspect of the present disclosure.

FIG. 11 illustrates example transmission point and codebook index selections for a reported PMI index in a four transmit antenna configuration, according to an aspect of the present disclosure.

FIGS. 15A-D illustrate example transmission point and codebook index selections for forced reporting with different ranks and PMI restriction sets, according to an aspect of the present disclosure.

DETAILED DESCRIPTION

Aspects of the present disclosure provide techniques for configuring a single CSI-RS, which may be used to support multi-point transmissions by legacy devices.

Multi-point transmission allows for the transmission of data to a UE from multiple transmission points and the reception of data at multiple transmission points from a UE. Multi-point transmission may be supported by the use of multiple channel state information reference signals (CSI-RS), which can be configured concurrently for multi-point transmissions. While newer devices may support transmission modes that allow for multi-point transmissions using multiple CSI-RS, legacy devices may only support transmission modes that do not support configuring more than one CSI-RS.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
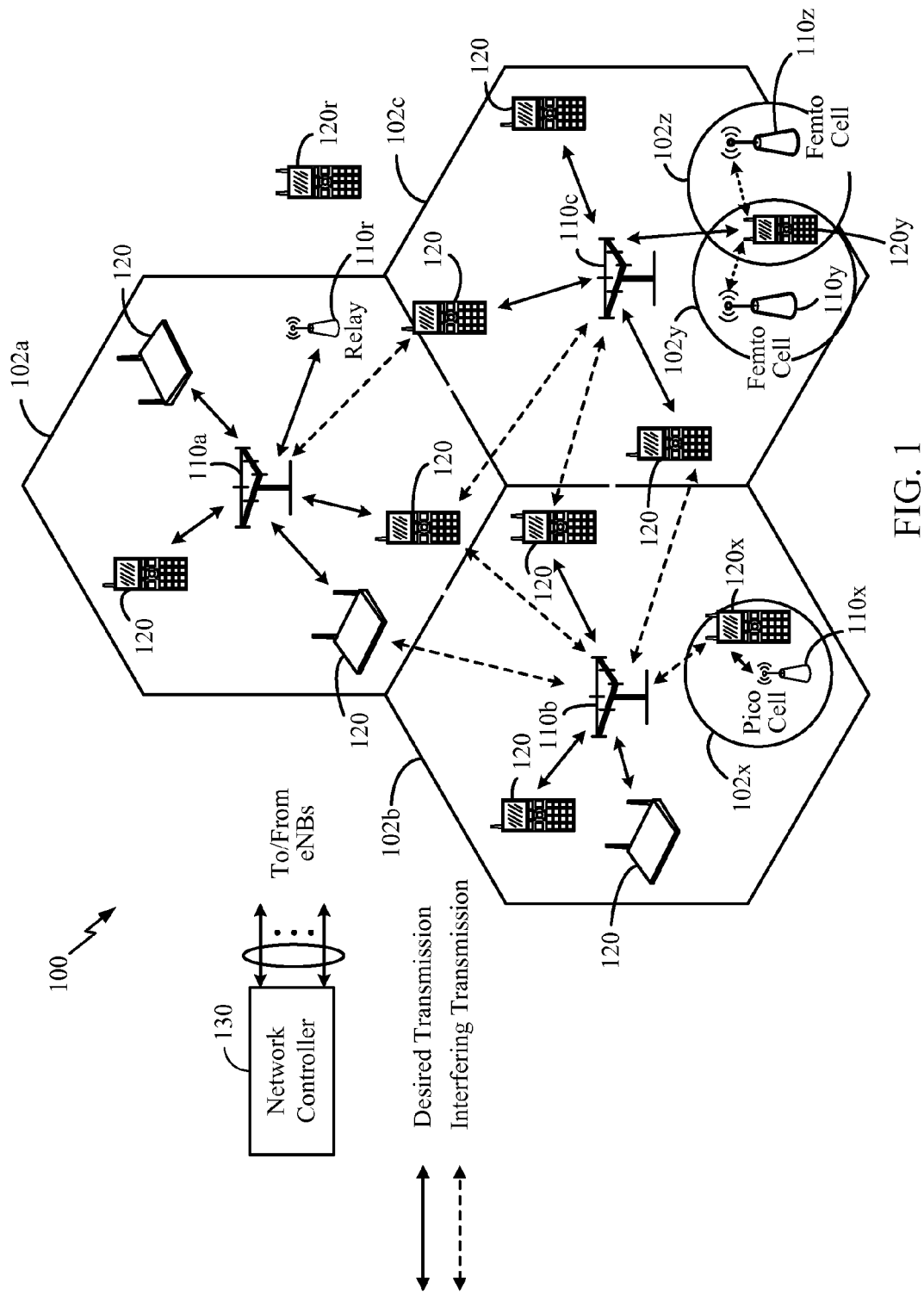
FIG. 1 is a block diagram conceptually illustrating an example of a wireless communications network, in accordance with certain aspects of the present disclosure.

FIG. 1 shows a wireless communication network 100, which may be an LTE network, in which aspects of the present disclosure may be performed. For example, evolved Node Bs 110 may be configured to direct or perform operations 800 illustrated in FIG. 8 to configure and use a single channel state information reference signal (CSI-RS) for transmission point selection and/or other processes or techniques for the techniques described herein.

As shown, the wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110$a$, 110$b$, and 110$c$ may be macro eNBs for macro cells 102$a$, 102$b$, and 102$c$, respectively. eNB 110$x$ may be a pico eNB for a pico cell 102$x$. eNBs 110$y$ and 110$z$ may be femto eNBs for femto cells 102$y$ and 102$z$, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110$r$ may communicate with eNB 110$a$ and a UE 120$r$ in order to facilitate communication between eNB 110$a$ and UE 120$r$. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
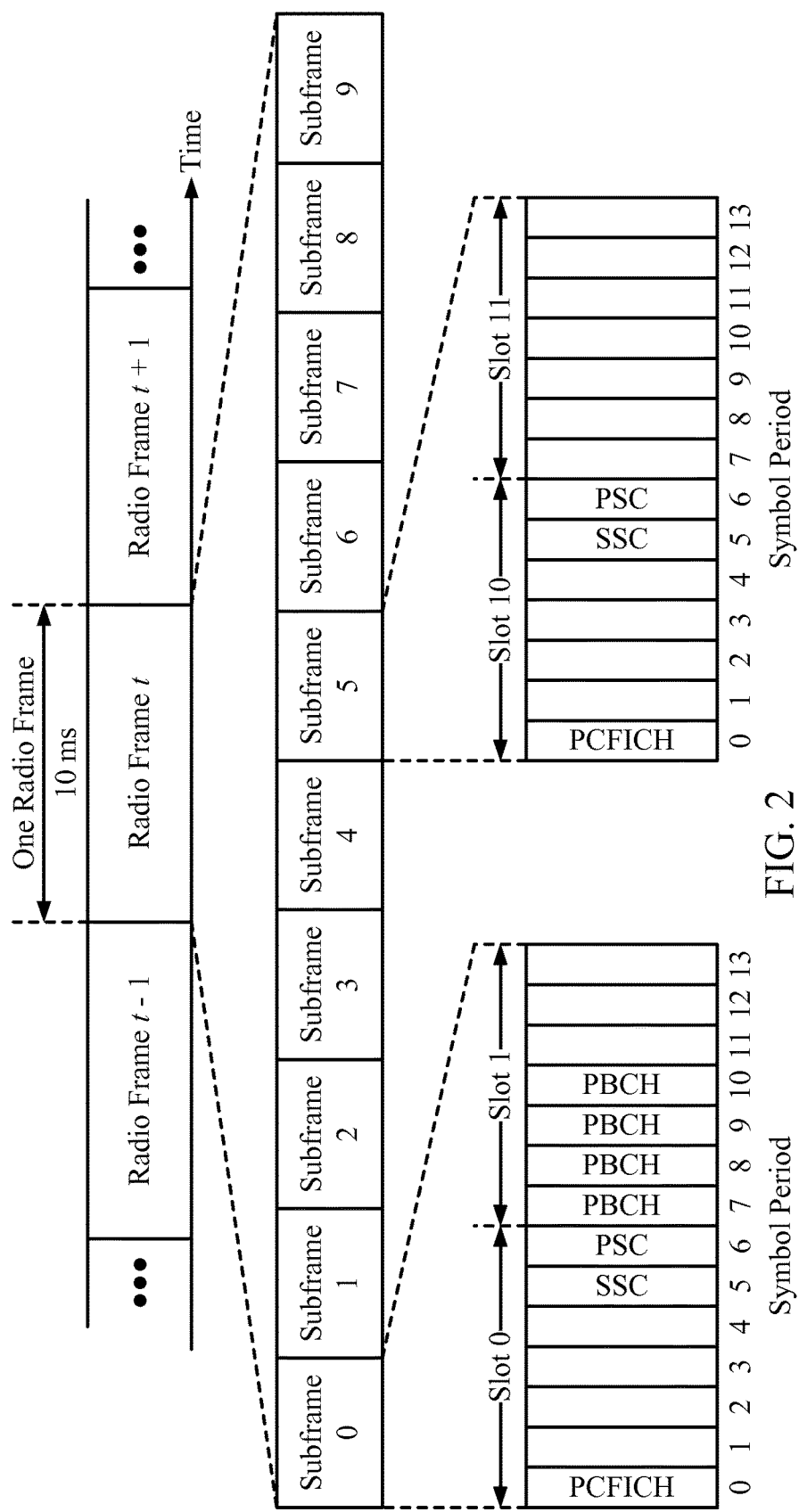
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks.

The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
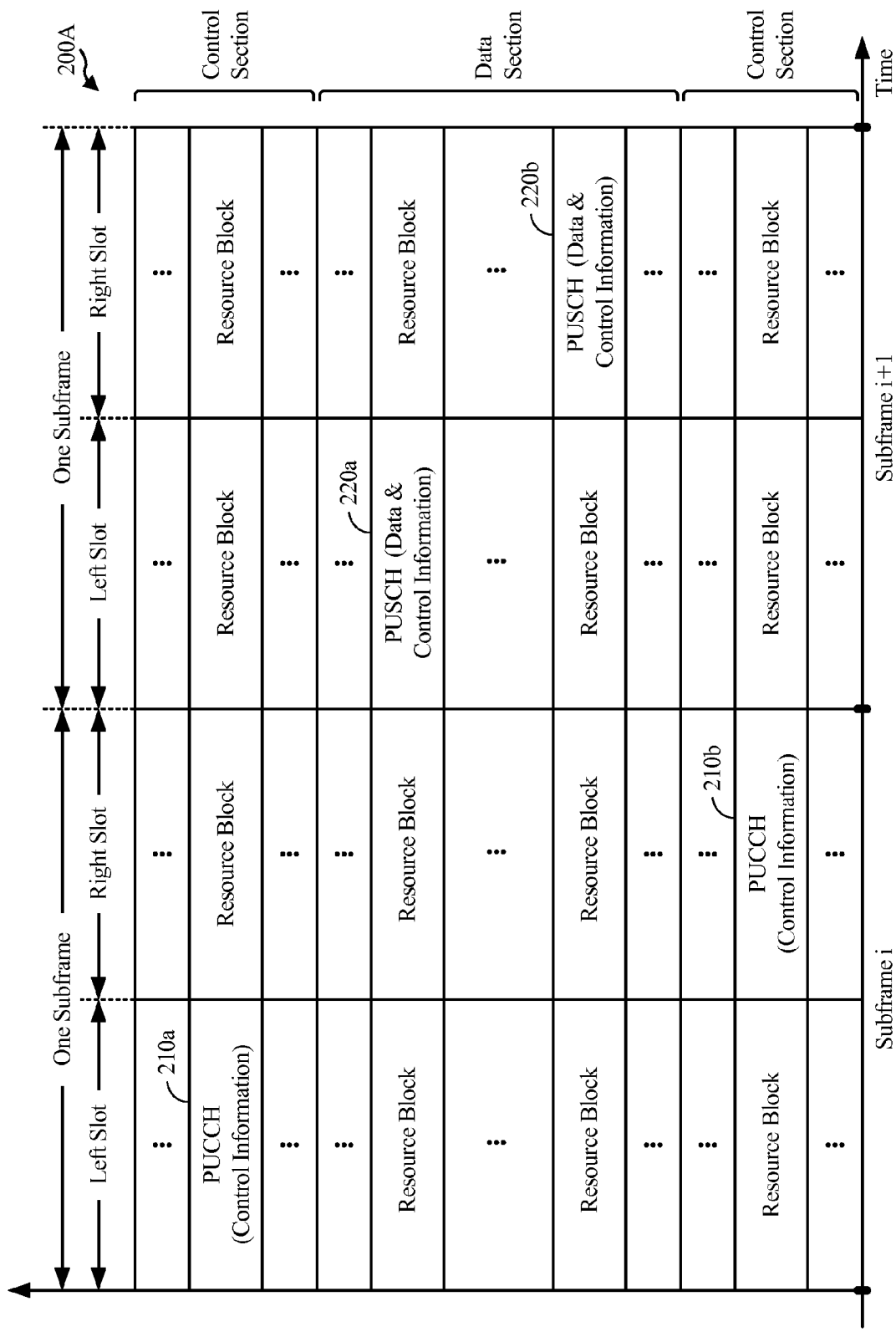
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for femto eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
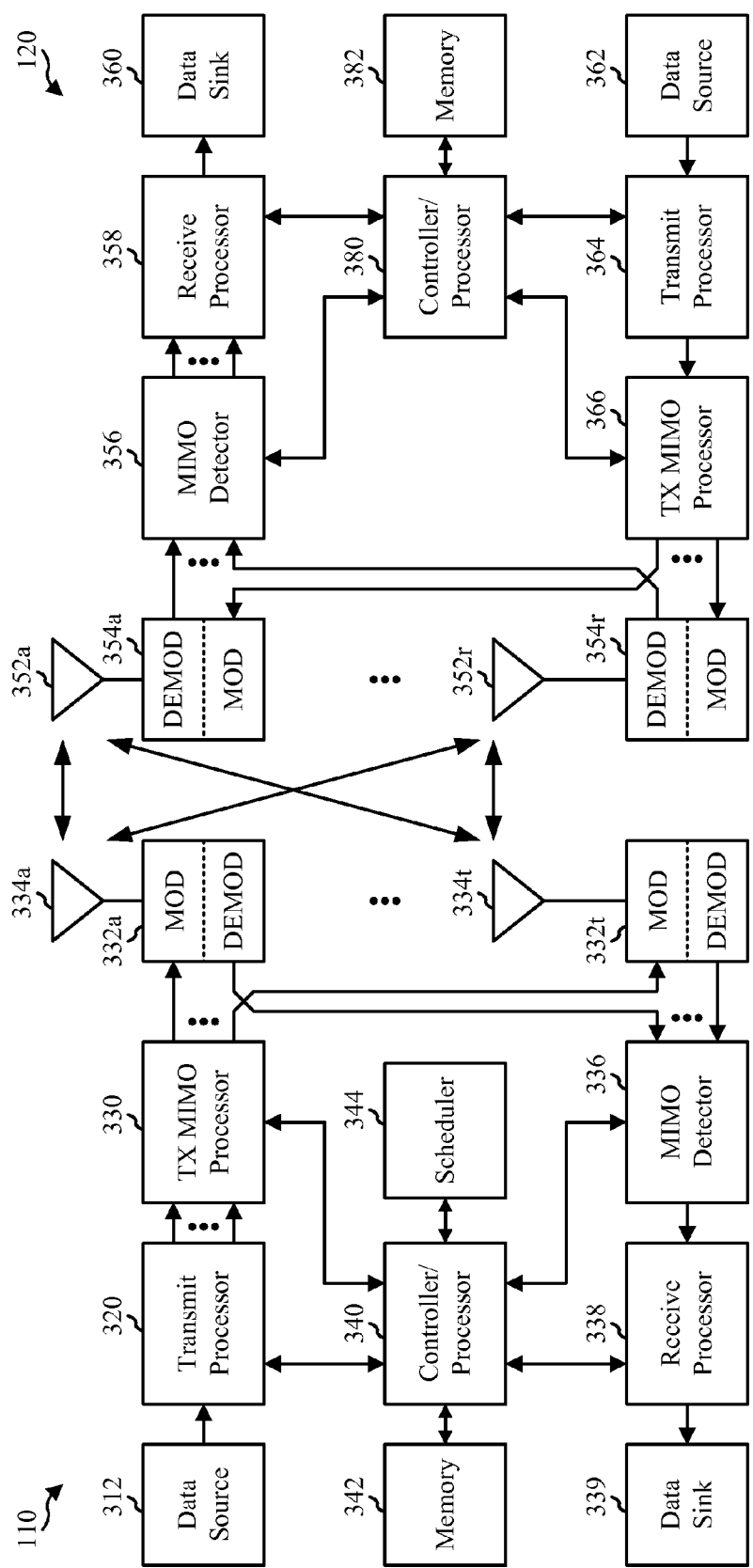
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 800 in FIG. 8 and/or other processes for the techniques described herein. The memories 342 and 382 may store data and program codes for the eNB 110 and the UE 120, respectively. A scheduler 344 may schedule UEs for data transmission on the downlink and/or uplink.

In some cases reference signals (e.g., pilots) may be transmitted allowing a UE to take measurements to make channel estimates and determine channel quality. As an example, a base station (e.g., an eNB) may transmit channel state information reference signals (CSI-RSs) according to a particular pattern, from a number of antenna ports. Based on the received signals, the UE may generate CSI feedback to be reported to the base station.

In some cases, LTE utilizes an implicit rank indicator/precoding matrix indicator/channel quality indicator (RI/PMI/CQI) feedback framework. CSI feedback conveys the preferred transmission rank, precoder, and packet format from the UE to the network. The UE conveys the preferred transmission rank with the RI, the preferred precoding matrix with the PMI, which is conditioned on the RI, and the preferred packet format with the CQI, which is conditioned on the RI and PMI. In some cases, feedback (rank/PMI/CQI) and TP selection may be determined based on channel conditions and also other factors (e.g., network load balancing).

RI/PMI/CQI feedback reflects average channel conditions over a portion of the bandwidth. Some metrics, such as RI and PMI, may be computed to reflect the average channel conditions across the system bandwidth (e.g., wideband RI/PMI). Some metrics, such as PMI and CQI, may be computed per subband. However, the subband granularity is still fairly coarse (e.g., 6PRBs). Averaging of CSI information may be undesirable for interference nulling. Averaging CSI information limits the network's ability to interpolate CSI feedback by the UE and limits the UE's ability to interpolate the precoder for demodulation.

Example Joint Transmission of CSI-RS for Channel State Feedback and Transmission Point Selection Aspects of the present provide techniques for joint transmission of channel state information reference signals (CSI-RS) from multiple transmission points (TPs) for channel state feedback and/or TP selection.

In certain systems (e.g., long term evolution (LTE) Release 11), coordinated multipoint (CoMP) in LTE targets multiple CoMP schemes including coordinated scheduling/ coordinated beamforming (CS/CB), dynamic point selection (DPS), and non-coherent (e.g. transparent) joint transmission (JT).

For JT schemes, multiple transmission points may schedule multiple UEs. According to certain aspects, JT may be utilized for transmitting (a single) CSI-RS (from multiple TPs) in a manner that allows CSI feedback to be used for DPS (TP selection).

Figure 4:
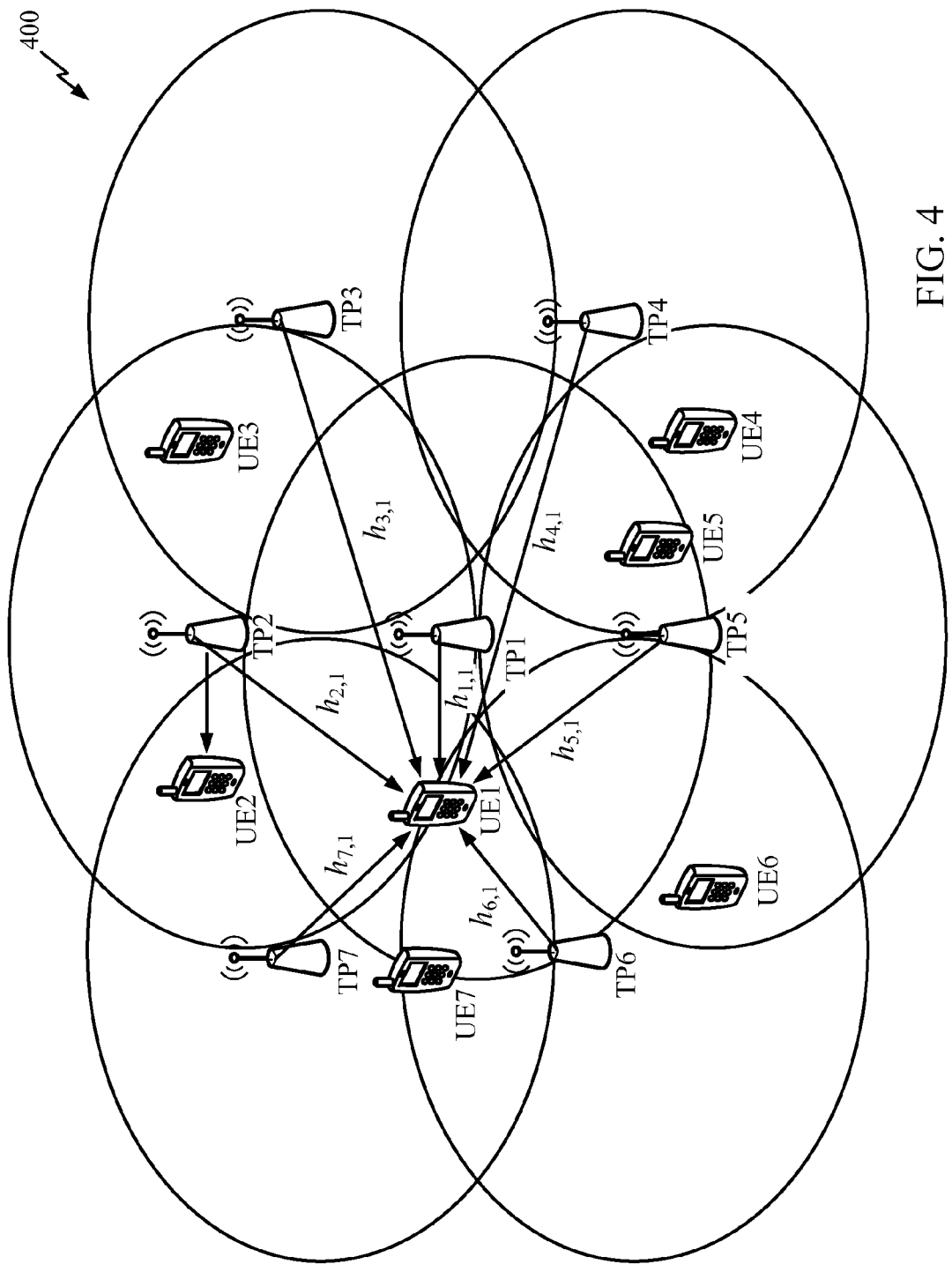
FIG. 4 illustrates an example coordinated multipoint (CoMP) cluster with joint transmissions from a large number of cells, in accordance with certain aspects of the present disclosure.

FIG. 4 illustrates an example CoMP cluster 400, in accordance with certain aspects of the present disclosure. As shown in FIG. 4, there may be joint transmission from one or more TPs. As described herein, one or more of multiple TPs (TP1-TP7) may jointly transmit a CSI-RS to one or more UEs (UE1-UE7). Feedback from a UE based on a jointly transmitted CSI-RS may be used for TP selection, for example, to select which of one or more of TP1-TP7 should serve that UE.

Aspects of the present disclosure provide techniques for providing a single channel state information reference signal (CSI-RS) to a legacy UE to enable support for multipoint transmissions in legacy UEs.

LTE Release 10 UEs may support LTE Transmission Mode 9, which allows a single CSI-RS to be configured, while LTE Release 11 UEs support LTE Transmission mode 10, which allows up to three CSI-RSs to be configured concurrently to support multipoint transmissions by allowing a UE to monitor channels from multiple transmission points. 3GPP standard also allows Release 11 UEs to signal capability of monitoring no more than one CSI-RS per carrier. These Release 11 UEs are also not capable to monitor channels from multiple transmission points using multiple CSI-RSs. In a mixed system (e.g., a system having LTE Release 10 and/or Release 11 UEs with different UE capabilities), the benefits of multipoint transmission may not be realized even though transmission points in the system may be synchronous in frequency and time. While a Release 10 UE or Release 11 UE with limited capability might possibly decode PDSCH from all TPs, such a UE is not able to provide feedback that might be used for TP selection, and channel state feedback (CSF) for a non-serving TP might not be obtained with conventional feedback. Aspects of the present disclosure, however, allow conventional feedback mechanisms by a UE to be used to provide feedback for TP selection and CSF for non-serving TPs (e.g., by jointly transmitted CSI-RS and codebook restriction described herein).

Figure 5:
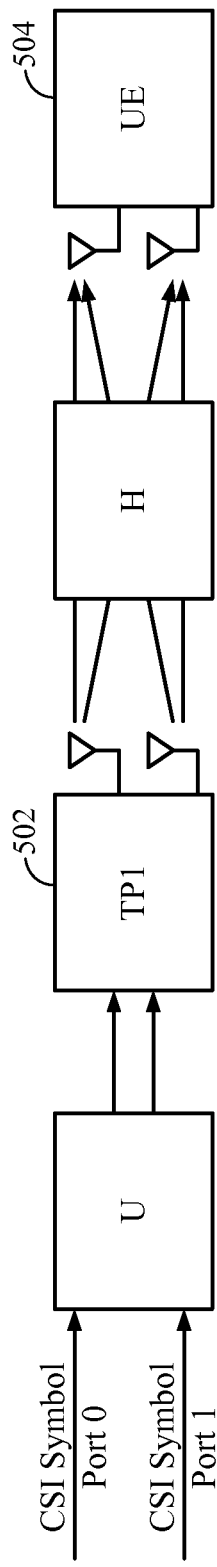
FIG. 5 illustrates an example transmission of a single channel state information reference signal (CSI-RS) from a single transmission point.

FIG. 5 illustrates an example of a single transmission point 502 transmitting a CSI-RS to a UE 504. A virtual antenna to physical antenna mapping U may be used to transmit a CSI-RS from a plurality of CSI symbol ports (e.g., CSI symbol ports 0 and 1) to a UE over channel H. UE 504 may estimate the effective channel HU and determine the best precoding matrix $\hat{P}$ within the constraint $\hat{P} \in \{P_i\}$ such that the channel HU$\hat{P}$ gives the best spectral efficiency. UE 504 may report $\hat{P}$ to the transmission point through, for example, PMI reporting.

H, U, and P may each be matrices. U may be dimensioned as the number of physical transmit antennas×the number of CSI-RS antenna ports. H may be dimensioned as the number of receive antennas×the number of physical transmit antennas. P may be dimensioned as the number of CSI-RS antenna ports×the number of layers. The precoding matrices that may be used for a given number of CSI-RS antenna ports may be defined in the LTE standard, and precoding matrix restrictions may be imposed on the matrices defined in the standard.

Figure 6:
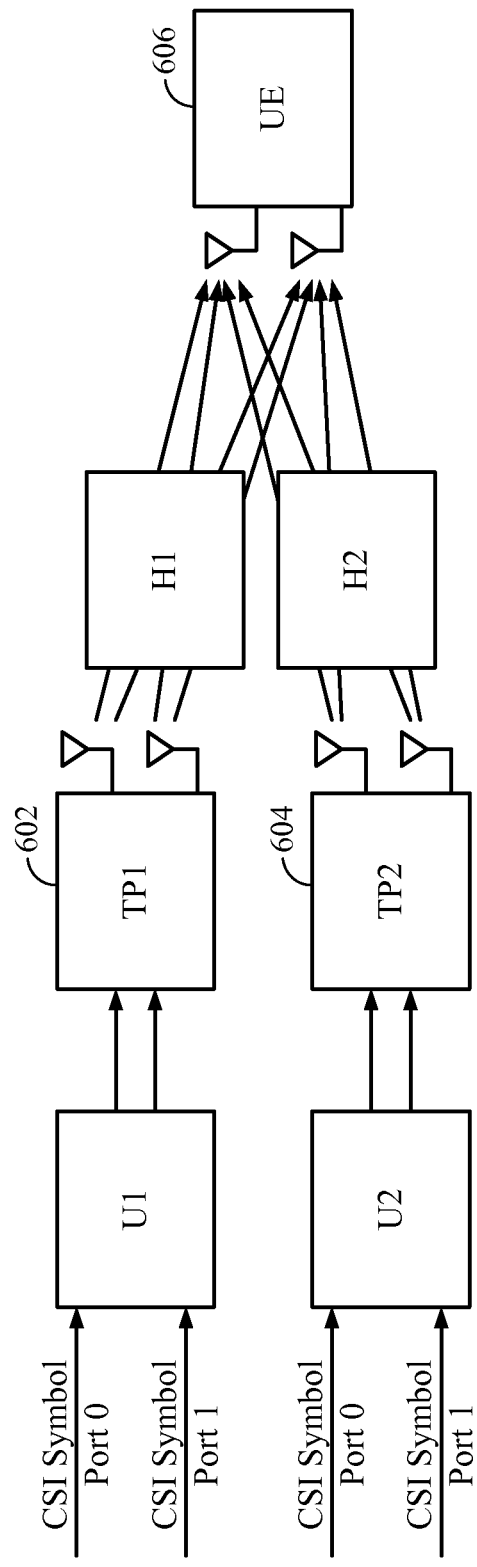
FIG. 6 illustrates an example transmission of a distinct CSI-RS from multiple transmission points.

FIG. 6 illustrates an example of multiple transmission points each transmitting a CSI-RS to a UE. While two transmission points TP1 602 and TP2 604 are illustrated in FIG. 6, any number of transmission points may transmit a CSI-RS to a UE. As in FIG. 5, each transmission point can use a virtual antenna to physical antenna mapping U to transmit a CSI-RS from a plurality of CSI symbol ports to UE 606 over channel H. In a multipoint situation, UE 606 may find the best precoding matrix for each transmission point and select the transmission point based on the estimated spectrum efficiency for the channels. For example, for two transmission points TP1 602 and TP2 604, precoding matrices can be designated $P_1$ and $P_2$. The best precoding matrices can be designated $\hat{P}_1$ and $\hat{P}_2$, and the transmission point selection can be based on the estimated spectral efficiency for channels $H_1 U_1 \hat{P}_1$ and $H_2 U_2 \hat{P}_2$. $U_1$ and $U_2$ may be assumed to have been absorbed in channels $H_1$ and $H_2$, respectively, equivalent to defining effective channels $H_1 U_1$ and $H_2 U_2$, respectively.

FIGS. 7A-7B illustrates example configurations 700A and 700B of using multiple transmission points to jointly configure a single CSI-RS and transmit the jointly configured CSI-RS to a UE, according to certain aspects of the present disclosure. A virtual antenna port mapping U may be configured as a combination of the port mappings for each of the plurality of transmission points. A transmission point may use virtual antenna port mapping U and CSI symbol ports from each of the plurality of transmission points (e.g. CSI symbol ports 0 and 1 of a first transmission point TP1 and CSI symbol ports 2 and 3 of transmission point TP2) to transmit a CSI-RS to the UE over a channel H. For example, as illustrated by 700A in FIG. 7A, transmission point TP1 702 may use a first virtual antenna port to physical antenna mapping ($U_1$) to transmit the jointly configured CSI-RS to UE 706. Correspondingly, as illustrated by example 700B in FIG. 7B, transmission point TP2 704 may use a second virtual antenna to physical antenna mapping ($U_2$) to transmit the jointly configured CSI-RS to UE 706. Each transmission point TP1 702, TP2 704 may have a power scaling component to select and/or vary the transmit power of CSI-RS signals from the transmission point.

Figure 8:
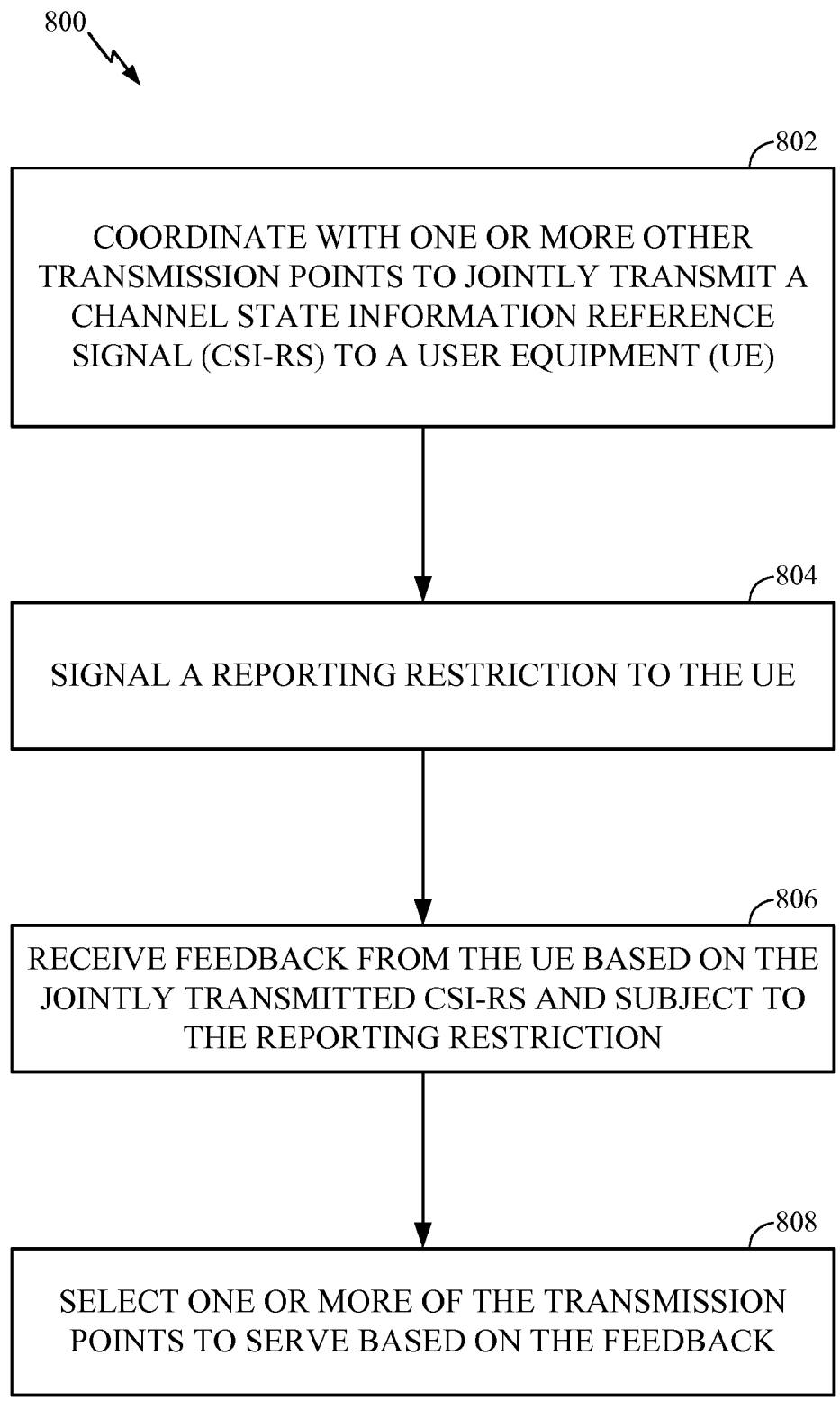
FIG. 8 illustrates example operations that may be performed by a transmission point to jointly transmit a CSI-RS and reporting restriction to a UE to select a transmission point to serve a UE, according to an aspect of the present disclosure.

FIG. 8 illustrates example operations 800 for transmitting a single CSI-RS over multiple transmission points in accordance with certain aspects of the present disclosure. The operations 800 may be performed, for example, by a transmission point participating in CoMP operations (e.g., one of TP1-TP7 shown in FIG. 4). The operations 800 may begin, at 802, by coordinating with one or more other TPs to jointly transmit a channel state information reference signal to a user equipment. At 804, the transmission point signals a reporting restriction to the UE. At 806, the transmission point receives feedback from the UE based on the jointly transmitted CSI-RS and subject to the reporting restriction. At 808, the transmission point selects one or more of the TPs to serve based on the feedback.

The number of CSI-RS ports may depend on the number of participating transmission points, the number of precoding dimensions allocated to each transmission point, and the number of physical transmit (Tx) antennas at each transmission point.

Virtual antenna port mappings for CSI-RS transmission at each transmission point may be designed to allow disjoint PMI and CQI feedback from participating transmission points. The antenna port mapping can be frequency and/or time dependent and may change across frequency and time. Antenna port mappings may be configured to satisfy physical transmission port power constraints.

PMI codebook restrictions may be constructed and signaled to a UE such that the PMI reported by the UE can be indicative of a transmission point selection and PMI feedback for a selected transmission point. Codebook restrictions may be reconfigured to support guaranteed reporting from another transmission point.

The network can change power scaling of CSI-RS at transmission points. With the appropriate time scale, feedback corresponding to each transmission point can be generated and reported by a UE. Power scaling may be performed such that the impact of time averaging by the UE is minimized Power scaling may also help create a bias in TP selection which may be useful, for example, in load balancing types of situations.

Periodic and aperiodic feedback reports may be configured. Periodic and aperiodic reporting in general shares the same codebook restriction. In eight CSI-RS port scenarios, certain periodic reporting modes impose additional codebook restrictions due to channel state feedback payload considerations.

For example, in a case where each transmission point has one Tx antenna, or has multiple Tx antennas but does not need PMI feedback, a two port CSI-RS and port mapping U may be configured. Port mapping U may be defined according to the equation:

$$U = \frac{1}{\sqrt{2}}\begin{bmatrix} 1 & 1 \\ 1 & -1 \end{bmatrix}$$

1-layer reporting may be constrained with precoding matrices $$\frac{1}{\sqrt{2}}\begin{bmatrix} 1 \\ 1 \end{bmatrix} \text{ and } \frac{1}{\sqrt{2}}\begin{bmatrix} 1 \\ -1 \end{bmatrix}.$$

The UE can estimate the channel:

$$[H_1 \ H_2]U = \frac{1}{\sqrt{2}}[H_1 \ H_2]\begin{bmatrix} 1 & 1 \\ 1 & -1 \end{bmatrix} = \frac{1}{\sqrt{2}}[H_1+H_2 \ H_1-H_2]$$

By comparing the allowed precoding matrices, the UE compares a channel defined as:

$$[H_1 \ H_2]U\frac{1}{\sqrt{2}}\begin{bmatrix} 1 \\ 1 \end{bmatrix} = \frac{1}{\sqrt{2}}[H_1+H_2 \ H_1-H_2]\frac{1}{\sqrt{2}}\begin{bmatrix} 1 \\ 1 \end{bmatrix} = H_1$$

with another channel defined as:

$$[H_1 \ H_2]U\frac{1}{\sqrt{2}}\begin{bmatrix} 1 \\ 1 \end{bmatrix} = \frac{1}{\sqrt{2}}[H_1+H_2 \ H_1-H_2]\frac{1}{\sqrt{2}}\begin{bmatrix} 1 \\ -1 \end{bmatrix} = H_2$$

Accordingly, if the UE reports precoding matrix information (PMI) for precoding matrix $$\frac{1}{\sqrt{2}}\begin{bmatrix} 1 \\ 1 \end{bmatrix},$$

an eNodeB can determine that $H_1$ is the better channel (e.g., has a higher spectral efficiency) than $H_2$, and CQI may be reported for $H_1$. Likewise, if the UE reports PMI for precoding matrix $$\frac{1}{\sqrt{2}}\begin{bmatrix} 1 \\ -1 \end{bmatrix},$$

an eNodeB can determine that $H_2$ is the better channel. The reported PMI may be used at the eNodeB to select the appropriate transmission point.

For transmission points with two Tx antennas, a 4-port CSI-RS or an 8-port CSI-RS may be configured for joint transmission. A U matrix and precoding restriction $\{P_i\}$ may be configured such that for each $P_i$, $U \cdot P_i$ is a block diagonal. For example, using a two layer precoding, $U \cdot P_i$ could be defined as:

$$U \cdot P_i = \begin{bmatrix} X_1 & X_2 \\ X_3 & X_4 \\ 0 & 0 \\ 0 & 0 \end{bmatrix} \text{ or } \begin{bmatrix} 0 & 0 \\ 0 & 0 \\ X_1 & X_2 \\ X_3 & X_4 \end{bmatrix}$$

such that each PMI precodes within one transmission point. With this example, the possible precoded channels can be:

$$[H_1 \ H_2]U \cdot P_i = H_1\begin{bmatrix} X_1 & X_2 \\ X_3 & X_4 \end{bmatrix} \text{ or } H_2\begin{bmatrix} X_1 & X_2 \\ X_3 & X_4 \end{bmatrix}$$

For a 4-port CSI-RS, a U matrix may defined as follows:

$$U = \frac{1}{\sqrt{2}} \cdot \begin{bmatrix} 0 & 1 & 0 & 1 \\ 1 & 0 & -1 & 0 \\ 1 & 0 & 1 & 0 \\ 0 & -1 & 0 & 1 \end{bmatrix}$$

A codebook restriction for 4-port CSI-RS to a UE could be defined as precoding indices 12, 13, 14, or 15 for 1-layer transmissions and indices 13 and 14 for 2-layer transmissions. Since $$U \cdot \begin{bmatrix} 0.5 & 0.5 & 0.5 & 0.5 \\ 0.5 & -0.5 & -0.5 & 0.5 \\ -0.5 & -0.5 & 0.5 & 0.5 \\ 0.5 & -0.5 & 0.5 & -0.5 \end{bmatrix} = \frac{1}{\sqrt{2}} \cdot \begin{bmatrix} 1 & 1 & 0 & 0 \\ 1 & -1 & 0 & 0 \\ 0 & 0 & 1 & 1 \\ 0 & 0 & 1 & -1 \end{bmatrix}$$

the column in the matrix on the left hand side of the equation may be a rank 1 precoding matrix with the columns representing, from left to right, precoding indices 13, 15, 14, and 12. The same matrix may also represent a rank 2 matrix, with the two leftmost rows representing precoding index 13 and the right two rows representing precoding index 15.

Accordingly, if a UE selects rank 1 and transmits PMI for precoding indices 13 or 15, an eNodeB may determine that a first transmission point is selected with the precoding matrix $$\frac{1}{\sqrt{2}}\begin{bmatrix} 1 \\ 1 \end{bmatrix} \text{ or } \frac{1}{\sqrt{2}}\begin{bmatrix} 1 \\ -1 \end{bmatrix}.$$

If a UE selects rank 1 and transmits PMI for precoding indices 12 or 14, the eNodeB may determine that a second transmission point is selected.

With a 4-port CSI-RS configuration, additional constraints may be imposed on which PMI the eNodeB can use for each transmission point. For example, for the restriction and U matrix used in the example above, an eNodeB may not receive information on precoding matrix $$\frac{1}{\sqrt{2}}\begin{bmatrix} 1 \\ -j \end{bmatrix}$$

for each transmission point. The choice of U matrix and PMI restrictions can cover different PMIs for each transmission point. Each transmission point may not need to use the same precoding matrix restriction.

For example, FIG. 9 illustrates rank 1 table 902 and rank 2 table 904 showing transmission point selection for rank 1 and rank 2 precoding matrices, respectively, according to certain aspects of the present disclosure. With a fixed U matrix and PMI restriction, an eNodeB may only obtain PMI feedback from two equivalent rank 1 precoding matrices and one equivalent rank 2 precoding matrix for the selected transmission point in addition to the transmission point selection based on 4-port PMI feedback.

In an example situation for transmission points with two Tx antennas, an S-port CSI-RS can be configured. An example U matrix may be defined as follows:

$$U = \frac{1}{2}\begin{bmatrix} 2 & 1-1j & 0 & 1+1j & 0 & 0 & 0 & 0 \\ 0 & 0 & 0 & 0 & 1+1j & 2 & 1-1j & 0 \\ 2 & -1+1j & 0 & -1-1j & 0 & 0 & 0 & 0 \\ 0 & 0 & 0 & 0 & 1+1j & -2 & 1-1j & 0 \end{bmatrix}$$

For 1-layer, the codebook may be restricted according to $i_1=0, 4, 8$ or $12$ and $i_2=0$ or $2$. For 2-layer, the codebook may be restricted according to $i_1=0, 4, 8$ or $12$ and $i_2=0$. The codebook restrictions may result in the following:

$$U \times \frac{1}{\sqrt{8}}\begin{bmatrix} v_0 & v_0 & v_8 & v_8 & v_{16} & v_{16} & v_{24} & v_{24} \\ \varphi_0 v_0 & \varphi_2 v_0 & \varphi_0 v_8 & \varphi_2 v_8 & \varphi_0 v_{16} & \varphi_2 v_{16} & \varphi_0 v_{24} & \varphi_2 v_{24} \end{bmatrix} =$$

$$\frac{1}{\sqrt{2}}\begin{bmatrix} 1 & 1 & 1 & 1 & 0 & 0 & 0 & 0 \\ 1 & -1 & 1j & -1j & 0 & 0 & 0 & 0 \\ 0 & 0 & 0 & 0 & 1 & 1 & 1 & 1 \\ 0 & 0 & 0 & 0 & 1 & -1 & 1j & -1j \end{bmatrix}$$

where $\varphi_n = e^{j\pi n/2}$ and $v_m = [1 \ e^{j2\pi m/32} \ e^{j4\pi m/32} \ e^{j6\pi m/32}]^T$. Based on PMI feedback from the UE, the eNodeB can determine the selected transmission point and codebook according to rank 1 table 1002 or rank 2 table 1004 shown in FIG. 10.

According to certain aspects, an eight-port CSI-RS can be configured for transmission point selection where the transmission points have four Tx antennas. An example U matrix may be defined as:

$$U = \frac{1}{\sqrt{8}}\begin{bmatrix} 2 & 1-1j & 0 & 1+1j & 0 & 0 & 0 & 0 \\ 0 & 0 & 0 & 0 & 0 & 1+1j & 2 & 1-1j \\ 0 & -1-1j & -2 & -1+1j & 0 & 0 & 0 & 0 \\ 0 & 0 & 0 & 0 & 2 & 1-1j & 0 & 1+1j \\ 2 & -1+1j & 0 & -1-1j & 0 & 0 & 0 & 0 \\ 0 & 0 & 0 & 0 & 0 & -1-1j & 2 & -1+1j \\ 0 & 1+1j & -2 & 1-1j & 0 & 0 & 0 & 0 \\ 0 & 0 & 0 & 0 & 2 & -1+1j & 0 & -1-1j \end{bmatrix}$$

For 1-layer, the precoding matrix may be restricted according to $i_1=0, 4, 8$ or $12$ and $i_2=0$ or $2$. For 2-layer, the precoding matrix may be restricted according to $i_1=0, 4, 8$ or $12$ and $i_2=0$. The U matrix and precoding matrix restrictions may result in the following:

$$U \times \frac{1}{\sqrt{8}}\begin{bmatrix} v_0 & v_0 & v_8 & v_8 & v_{16} & v_{16} & v_{24} & v_{24} \\ \varphi_0 v_0 & \varphi_2 v_0 & \varphi_0 v_8 & \varphi_2 v_8 & \varphi_0 v_{16} & \varphi_2 v_{16} & \varphi_0 v_{24} & \varphi_2 v_{24} \end{bmatrix} =$$

$$\frac{1}{2}\begin{bmatrix} 1 & 1 & 1 & 1 & 0 & 0 & 0 & 0 \\ 1 & -1 & -1 & 1 & 0 & 0 & 0 & 0 \\ -1 & -1 & 1 & 1 & 0 & 0 & 0 & 0 \\ 1 & -1 & 1 & -1 & 0 & 0 & 0 & 0 \\ 0 & 0 & 0 & 0 & 1 & 1 & 1 & 1 \\ 0 & 0 & 0 & 0 & 1 & -1 & -1 & 1 \\ 0 & 0 & 0 & 0 & -1 & -1 & 1 & 1 \\ 0 & 0 & 0 & 0 & 1 & -1 & 1 & -1 \end{bmatrix}$$

An eNodeB can calculate the selected transmission point and PMI according to rank 1 table 1102 and rank 2 table 1104 shown in FIG. 11.

With a codebook for transmission points with eight Tx antennas, PMI reporting may be further restricted with a physical uplink control channel (PUCCH) type. This restriction by an eNodeB can force a UE to report for one of the multiple transmission points. For example, in PUCCH mode 1-1, submode 2, a UE may only report even $i_1$, and $i_2$ may be limited to 0 or 2 in rank 1 and 0 or 1 in rank 2. An additional constraint in U matrix construction may be added such that PMIs that map to one of the transmission points use PMI allowed by the selected PUCCH mode. This restriction can be used to force a UE to report on only one of the plurality of transmission points using the selected PUCCH mode. The eNodeB may continue to obtain reporting for the best of the other transmission points through another reporting format.

An example U matrix with a PUCCH mode restriction may be defined as follows:

$$U = 4 \begin{bmatrix} 1 & 1 & 1 & 1 & 0 & 0 & 0 & 0 \\ 1 & -1 & 1j & -1j & 0 & 0 & 0 & 0 \\ 0 & 0 & 0 & 0 & 1 & 1 & 1 & 1 \\ 0 & 0 & 0 & 0 & 1 & -1 & 1j & -1j \end{bmatrix} \times$$

$$\begin{bmatrix} v_0 & v_0 & v_{16} & v_{16} & v_2 & v_2 & v_{18} & v_{18} \\ \varphi_0 v_0 & \varphi_2 v_0 & \varphi_0 v_{16} & \varphi_2 v_8 & \varphi_0 v_2 & \varphi_2 v_2 & \varphi_0 v_{18} & \varphi_2 v_{18} \end{bmatrix}^{-1}$$

For 1-layer, the codebook may be restricted according to $i_1=0, 1, 8,$ or 9 and $i_2=0, 2$. For 2-layer, the codebook may be restricted according to $i_1=0, 1, 8$ or 9 and $i_2=0$. Based on PMI feedback from the UE, an eNodeB can determine the selected transmission point and codebook index according to rank 1 table 1202 and rank 2 table 1204 shown in FIG. 12.

Figure 12:
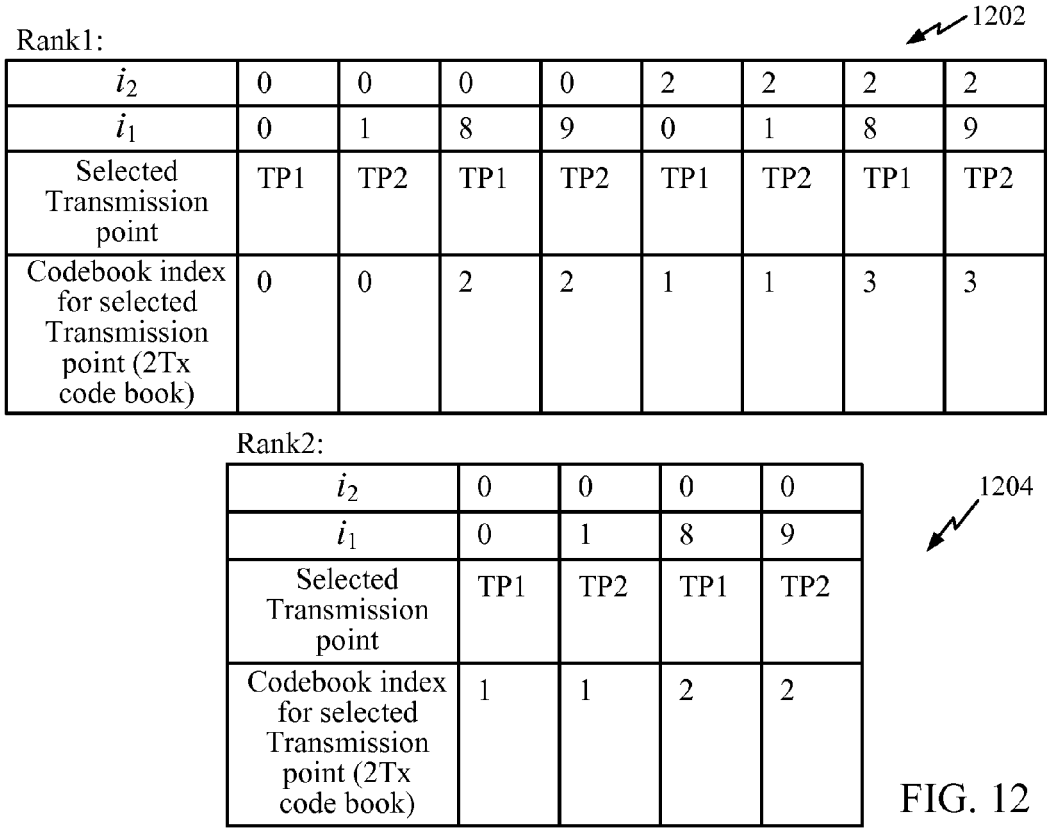
FIG. 12 illustrates example transmission point and codebook index selections for a reported set of indices in a forced reporting configuration, according to an aspect of the present disclosure.
Figure 13:
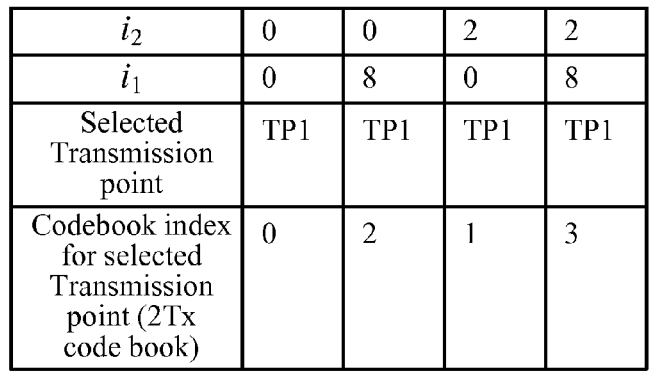
FIG. 13 illustrates example transmission point and codebook index selections for forced reporting in PUCCH mode 1-1, submode 2, according to an aspect of the present disclosure.
Figure 13:
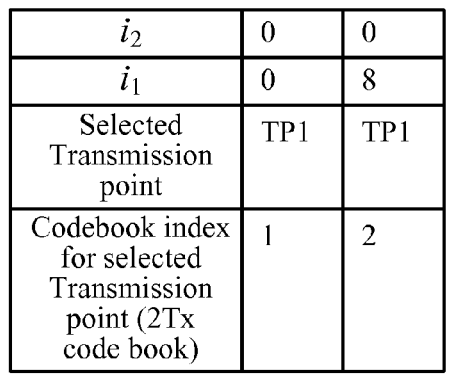

As shown in FIG. 12, all even $i_1$ and $i_2 \in \{0,2\}$ may be mapped to a first transmission point. Using PUCCH mode 1-1, submode 2 as an example, an eNodeB can force a UE to report channel quality information for a first transmission point. With other reporting modes, the eNodeB can receive both a transmission point selection and CQI reporting based on the selected transmission point. The reporting with PUCCH mode 1-1, submode 2 may be seen in rank 1 table 1302 and rank 2 table 1304 illustrated in FIG. 13.

Figure 14A:
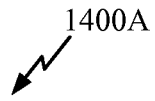
FIGS. 14A-B illustrate example transmission point and codebook index selections for forced reporting with different PMI restriction sets, according to an aspect of the present disclosure.

Forced reporting may allow for the development of a single U matrix and two sets of PMI restrictions such that with different PMI restrictions, different transmission points can be forced in PUCCH reporting. For example, given the U matrix defined by the following equation:

$$U = 4 \begin{bmatrix} 1 & 1 & 1 & 1 & 0 & 0 & 0 & 0 \\ 1 & -1 & 1j & -1j & 0 & 0 & 0 & 0 \\ 0 & 0 & 0 & 0 & 1 & 1 & 1 & 1 \\ 0 & 0 & 0 & 0 & 1 & -1 & 1j & -1j \end{bmatrix} \times$$

$$\begin{bmatrix} v_0 & v_2 & v_4 & v_6 & v_0 & v_2 & v_4 & v_6 \\ \varphi_0 v_0 & \varphi_0 v_2 & \varphi_0 v_4 & \varphi_0 v_6 & \varphi_2 v_0 & \varphi_2 v_2 & \varphi_2 v_4 & \varphi_2 v_6 \end{bmatrix}^{-1}$$

and with Rank 2 reporting disabled, two PMI restrictions for Rank 1 may be identified. A first restriction set may be defined as $i_1=0, 1,$ or 2 and $i_2=0, 10$. If the first restriction set is enforced, a selected transmission point and codebook may be defined according to the table 1400A shown in FIG. 14A. Using PUCCH mode 1-1, submode 2 restrictions as an example, it may be seen that all PMI satisfying the restriction have a first transmission point selected.

Figure 14B:
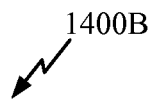

A second restriction set may be defined as $i_1=0, 1,$ or 2 and $i_2=2, 8$. If the second restriction set is enforced, a selected transmission point and codebook may be defined according to the table 1400B shown in FIG. 14B. Using PUCCH mode 1-1, submode 2 restrictions as an example, it may be seen that all PMI satisfying the restriction have a second transmission point selected.

It may be noted that with the same U matrix and CSI-RS, an eNodeB can potentially configure different PMI restrictions to force a UE to report information for a particular transmission point in a PUCCH mode. Reconfiguration of a PMI restriction set can be tied to physical downlink shared channel (PDSCH) transmission point switching instances.

Codebook restrictions may be designed to allow for both rank 1 and rank 2 reporting on the PUSCH while switching the transmission point on the PUCCH report. A U matrix for this may be defined according to the following:

$$U = 4 \begin{bmatrix} 1 & 1 & 1 & 1 & 0 & 0 & 0 & 0 \\ 1 & -1 & 1j & -1j & 0 & 0 & 0 & 0 \\ 0 & 0 & 0 & 0 & 1 & 1 & 1 & 1 \\ 0 & 0 & 0 & 0 & 1 & -1 & 1j & -1j \end{bmatrix} \times$$

$$\begin{bmatrix} v_0 & v_3 & v_{10} & v_{10} & v_0 & v_3 & v_{14} & v_{14} \\ \varphi_0 v_0 & \varphi_0 v_3 & \varphi_1 v_{10} & \varphi_3 v_{10} & \varphi_2 v_0 & \varphi_2 v_3 & \varphi_1 v_{14} & \varphi_3 v_{14} \end{bmatrix}^{-1}$$

For a first PMI restriction set, rank 1 (1 layer) restrictions may be defined as $i_1=0$ and $i_2=0, 14$. Rank 2 (2 layer) restrictions may be defined as $i_1=5$ or 7 and $i_2=1$. The selection of transmission points and codebook indices with the first restriction and rank 1 may be illustrated by table 1500A shown in FIG. 15A. The selection of transmission points and codebook indices with the first restriction and rank 2 may be illustrated by table 1500B shown in FIG. 15B.

For a second PMI restriction set, rank 1 restrictions may be defined as $i_1=0$ and $i_2=2, 12$. Rank 2 restrictions may be defined as $i_1=5$ or 7 and $i_2=1$. The selection of transmission points and codebook indices with the second restriction and rank 1 may be illustrated by table 1500C shown in FIG. 15C. The selection of transmission points and codebook indices with the second restriction and rank 2 may be illustrated by table 1500D shown in FIG. 15D.

A UE may be able to partially detect that an eNodeB is using joint transmission of a single CSI-RS for multipoint transmission support from PMI restrictions specified by the eNodeB. For example, if the set of allowed precoding matrices can be decomposed into block diagonal matrices for every possible rank with the same U matrix, a UE can determine that the network supports multipoint transmission using a single CSI-RS.

Transmission points with varying numbers of Tx antennas may participate in joint transmission of a single CSI-RS for multipoint transmissions. For example, if one transmission point has a single Tx antenna and another transmission point has multiple Tx antennas, the U matrix and precoding restriction could be configured for the two Tx antenna example described above. The transmission point with a single Tx antenna may be restricted to use a single precoding matrix.

Jointly configured CSI-RS can be used for UEs that are configured to monitor a single cell. In an environment of UEs, some of which can monitor multiple transmission points and some of which can monitor a single transmission point, a common U matrix, jointly configured CSI-RS, and PMI restrictions can be used. UEs that monitor multiple transmission points can report the best of the multiple transmission points. UEs that monitor a single transmission point can report for a designated transmission point using different PMI restrictions.

Joint configuration of CSI-RS can be used for any number of transmission points. The number of blocks in a block diagonal matrix can determine the number of transmissions points that can be compared. For example, an 8 CSI-RS port transmission could support four transmission points with two Tx antennas at each transmission point.

Feedback may be ensured for a number of transmission points. Example operations that may be used to ensure the receipt of feedback for a number of transmission points are described below. While the examples described herein have involved 1 and 2-layer feedback, those skilled in the art will recognize the techniques are not limited to 1 and 2-layer feedback and may be applied to higher layer feedback, as well.

The network can reconfigure the PMI codebook restriction for the UE. For example, PMI codebook restrictions may be reconfigured through radio resource control (RRC) signaling to change the transmission point for which reporting is requested. These operations can entail, for example, power scaling or setting up a particular PUCCH mode for a particular port configuration (e.g., PUCCH mode 2-2 configuration for an 8 CSI-RS port configuration). For example, the network can select a number of PMI restriction sets corresponding to the number of transmission points and signal a selected PMI restriction set to the UE. PMI restrictions can be tied to changing transmission points for PDSCH transmission.

To ensure the receipt of feedback, RRC reconfiguration may be used. RRC reconfiguration may change the PMI codebook restriction for the UE as the UE changes a switching point for the PDCCH. In another example, RRC reconfiguration could be used to change the CSI-RS configuration to a UE. Participating transmission points may transmit two sets of CSI-RS configurations jointly, each with an appropriate virtual antenna mapping. The virtual antenna mapping and power scaling for each CSI-RS configuration may be configured such that feedback for one transmission point is likely or guaranteed. For example, one CSI-RS configuration could entail a CSI-RS transmission with lower power for a first transmission point, and another CSI-RS configuration could entail a CSI-RS transmission with lower power for a second transmission point. Using an 8 CSI-RS configuration as an example, the virtual antenna mapping of one CSI-RS configuration may entail reversing the role of a number of transmission points in a particular PUCCH mode.

Frequency selective virtual antenna mapping from multiple sets, along with subband-based feedback, may be used to ensure feedback from a number of transmission points. A virtual antenna mapping may be changed across frequencies in a way that aligns with bandwidth parts and/or subbands. For example, each bandwidth part or subband may be associated with a transmission point such that the virtual antenna mapping for a particular bandwidth part or subband enables the transmission point. The network can enable aperiodic reporting for higher layers configured using a subband CQI report. For example, UEs can be configured in PUSCH mode 3-1, which may entail a UE reporting CQI for subbands or bandwidth parts associated with multiple transmission points in a PUSCH report. The network may be configured to enable 8 CSI-RS ports and enable PUCCH reporting mode 2-2 with UE selected subband CQI and PMI. This may provide PMI and CQI reporting for each subband. For reporting instances associated with a procedure transaction identity (PTI) of 1, subband PMI and subband CQI may be provided for each bandwidth part.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a transmission point (TP), comprising:
   coordinating with one or more other TPs to jointly transmit a channel state information reference signal (CSI-RS) to a user equipment (UE), wherein the coordinating comprises determining a virtual antenna port mapping, wherein each of the plurality of TPs have different antenna port mappings configured to allow disjoint precoding matrix indicator (PMI) or channel quality indicator (CQI) feedback, wherein the virtual antenna port mapping comprises at least one matrix and one or more sets of PMI restrictions, and wherein the virtual antenna port mapping forces feedback for a particular TP;
   signaling a reporting restriction, based at least in part on the one or more sets of PMI restrictions, to the UE, the reporting restriction indicating a limited set of PMIS that may be reported by the UE;
   receiving PMI feedback from the UE based on the jointly transmitted CSI-RS and subject to the reporting restriction; and
   selecting one or more of the TPs to serve the UE based on the PMI feedback and the reporting restriction.

2. The method of claim 1, wherein the reporting restriction comprises a PMI codebook restriction, and wherein PMI reported by the UE indicates TP selection.

3. The method of claim 2, further comprising revising the codebook restriction if reporting from other TPs is required.

4. The method of claim 1, wherein the reporting restriction comprises a further restriction on PMI reporting by configuring certain periodic reporting modes.

5. The method of claim 1, wherein the coordinating comprises coordinating transmit power of the jointly transmitted CSI-RS on TPs.

6. The method of claim 1, further comprising:
   configuring the UE for periodic reporting of feedback corresponding to a first TP and aperiodic reporting of feedback corresponding to TP selection and PMI/CQI feedback for the first TP and at least a second TP.

7. The method of claim 6, wherein the second TP is selected based on feedback indicating the second TP corresponds to a best cell of the cells served by the one or more other TPs.

8. The method of claim 1, wherein at least one of the plurality of TPs have one antenna and the virtual antenna port mapping comprises at least a two-port mapping.

9. The method of claim 1, wherein at least one of the plurality of TPs have at least two antennas.

10. The method of claim 9, wherein the virtual antenna port mapping comprises at least one of a four-port mapping or an eight-port mapping.

11. An apparatus for wireless communications by a transmission point (TP), comprising:
    a transmitter configured to:
       coordinate with one or more other TPs to jointly transmit a channel state information reference signal (CSI-RS) to a user equipment (UE), wherein the coordinating comprises determining a virtual antenna port mapping, wherein each of the plurality of TPs have different antenna port mappings configured to allow disjoint precoding matrix indicator (PMI) or channel quality indicator (CQI) feedback, wherein the virtual antenna port mapping comprises at least one matrix and one or more sets of PMI restrictions, and wherein the virtual antenna port mapping forces feedback for a particular TP; and
       signal a reporting restriction, based at least in part on the one or more sets of PMI restrictions, to the UE, the reporting restriction indicating a limited set of PMIS that may be reported by the UE;
    a receiver configured to receive PMI feedback from the UE based on the jointly transmitted CSI-RS and subject to the reporting restriction; and
    a processor configured to select one or more of the TPs to serve the UE based on the PMI feedback and the reporting restriction.

12. The apparatus of claim 11, wherein the reporting restriction comprises a PMI codebook restriction, and wherein PMI reported by the UE indicates TP selection.

13. The apparatus of claim 12, wherein the processor is further configured to revise the codebook restriction if reporting from other TPs is required.

14. The apparatus of claim 11, wherein the reporting restriction comprises a further restriction on PMI reporting by configuring certain periodic reporting modes.

15. The apparatus of claim 11, wherein the coordinating comprises coordinating transmit power of the jointly transmitted CSI-RS on TPs.

16. The apparatus of claim 11, wherein the transmitter is further configured to:
    configure the UE for periodic reporting of feedback corresponding to a first TP and aperiodic reporting of feedback corresponding to TP selection and PMI/CQI feedback for the first TP and at least a second TP.

17. The apparatus of claim 16, wherein the second TP is selected based on feedback indicating the second TP corresponds to a best cell of the cells served by the one or more other TPs.

18. The apparatus of claim 11, wherein at least one of the plurality of TPs have one antenna and the virtual antenna port mapping comprises at least a two-port mapping.

19. The apparatus of claim 11, wherein at least one of the plurality of TPs have at least two antennas.

20. The apparatus of claim 19, wherein the virtual antenna port mapping comprises at least one of a four-port mapping or an eight-port mapping.

21. An apparatus for wireless communications by a transmission point (TP), comprising:
- means for coordinating with one or more other TPs to jointly transmit a channel state information reference signal (CSI-RS) to a user equipment (UE), wherein the coordinating comprises determining a virtual antenna port mapping, wherein each of the plurality of transmission points have different antenna port mappings configured to allow disjoint precoding matrix indicator (PMI) or channel quality indicator (CQI) feedback, wherein the virtual antenna port mapping comprises at least one matrix and one or more sets of PMI restrictions, and wherein the virtual antenna port mapping forces feedback for a particular TP;
- means for signaling a reporting restriction, based at least in part on the one or more sets of PMI restrictions, to the UE, the reporting restriction indicating a limited set of PMIS that may be reported by the UE;
- means for receiving PMI feedback from the UE based on the jointly transmitted CSI-RS and subject to the reporting restriction; and
- means for selecting one or more of the TPs to serve the UE based on the PMI feedback and the reporting restriction.

22. A non-transitory computer readable medium, comprising instructions for:
- coordinating with one or more other TPs to jointly transmit a channel state information reference signal (CSI-RS) to a user equipment (UE), wherein the coordinating comprises determining a virtual antenna port mapping, wherein each of the plurality of transmission points have different antenna port mappings configured to allow disjoint precoding matrix indicator (PMI) or channel quality indicator (CQI) feedback, wherein the virtual antenna port mapping comprises at least one matrix and one or more sets of PMI restrictions, and wherein the virtual antenna port mapping forces feedback for a particular TP;
- signaling a reporting restriction, based at least in part on the one or more sets of PMI restrictions, to the UE, the reporting restriction indicating a limited set of PMIS that may be reported by the UE;
- receiving PMI feedback from the UE based on the jointly transmitted CSI-RS and subject to the reporting restriction; and
- selecting one or more of the TPs to serve the UE based on the PMI feedback and the reporting restriction.

* * * * *